April 1, 1952 M. MAAG 2,591,453
EXTERNAL CALIPER WITH DEMOUNTABLE FRAME
Filed May 7, 1947

INVENTOR
Max Maag
By [signature]
ATTORNEY

Patented Apr. 1, 1952

2,591,453

UNITED STATES PATENT OFFICE 2,591,453

EXTERNAL CALIPER WITH DEMOUNTABLE FRAME

Max Maag, Zurich, Switzerland

Application May 7, 1947, Serial No. 746,510
In Switzerland May 2, 1946

Section 1, Public Law 690, August 8, 1946
Patent expires May 2, 1966

4 Claims. (Cl. 33—147)

The present invention relates to an appliance for measuring the diameter of shafts, the thickness of plates and the like, and is intended to replace as a measuring instrument the snap gauges which are much used in the engineering industry, but are only suitable for checking. In order that this aim may be fulfilled, the appliance must be as convenient and quick to handle, and be able to detect as small differences in dimensions as snap gauges. The present device differs in that, instead of the work engaging frame being in one piece with the measuring shaft, for measuring dimensions which differ by more than the measuring range of the non-changeable needle, frames of different size are used which are firmly clamped in the shaft in an easily exchangeable manner, that the needle, cylindrical in the front part, runs in a cylindrical guide and has two sloping surfaces forming at their line of intersection the desired angle of taper, that the feeler bolt seated astride on the needle has corresponding sloping surfaces, that the needle is effectively prevented, by a pneumatic brake, from moving too quickly forward under spring pressure—that the dial gauge for measuring the movement of the needle is fixed to the shaft, and is free to rotate around the axis of the shaft—and that the dial gauge, in addition to the usual tolerance marks for the main scale, is equipped with an adjustable mark for the counting scale showing the number of turns made by the pointer on the main scale.

One embodiment of the appliance forming the object of the invention is illustrated by way of example in the accompanying drawing, in which.

Figure 1:
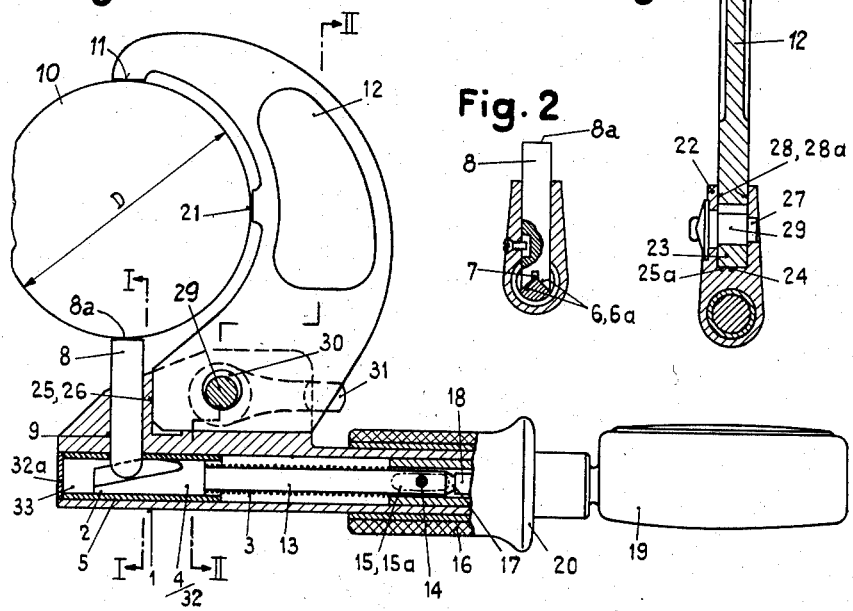
Fig. 1 illustrates a longitudinal section through the appliance.
Figures 2, 3:
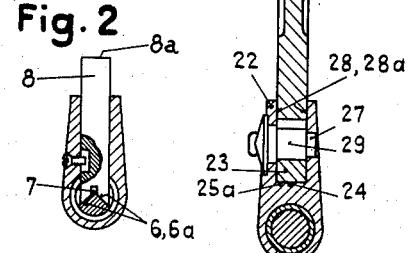
Figs. 2 and 3 are cross-sections on the lines I—I and II—II respectively of Fig. 1.
Figure 4:
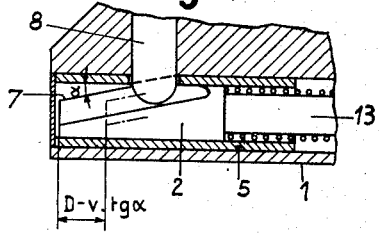
Figs. 4 and 5 are details from Fig. 1 on a larger scale and show the position of the needle with respect to its guide in the extreme forward and in retracted positions.
Figure 5:
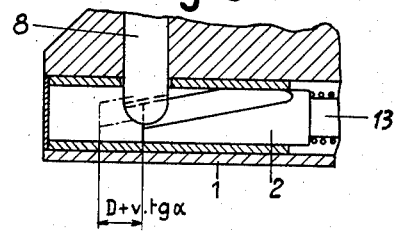

In a hollow shaft 1 a needle 2 is loosely supported and continually pressed forward by the spring 3. The front thickened part 4 of the needle is provided with two oblique surfaces 6 and 6a, inclined to each other at about a right angle, their line of intersection 7 lies in the plane of the needle axis and forms with it an angle whose tangent gives the so-called taper of the wedge represented by the needle. On these inclined surfaces of the needle a measuring bolt 8 is fitted astride and moves in a guideway 9 at right angles to the axis of the shaft. This bolt 8 is moved outwardly when the needle moves forward, until its flat-machined measuring surface 8a comes into contact with the workpiece 10 to be measured, which in its turn engages against the anvil 11 of frame 12 fixed detachably to the shaft.

The rear, narrower part 13 of the needle is passed through by a cross-pin 14, which also passes through the shaft 1 in slots 15 and 15a and is fixed in a bush 16 in the form of a handle longitudinally movable on the shaft.

The rear end of needle 17 stands opposite to a spindle or feeler 18 of a dial gauge arranged in the rear end of the shaft, the dial gauge being held constantly in contact with the end of the needle through a rack and toothed wheel gear (not shown in the drawing) by means of a spring arranged in the gauge (also not shown in the drawing).

When measuring the diameter D of the workpiece, the appliance is held in the hand so that the rear part of the edge of the dial gauge lies on the ball of the thumb, whilst the index and middle fingers are laid round the raised edge 20 of the handle 16, so that this handle and thereby the needle can be drawn back. When the handle 16 is drawn back, the measuring bolt 8 is retracted and the feeler 18 of the dial gauge is pushed back, the pointer rotating through a corresponding angle on the dial. The distance between the frame anvil 11 and the measuring bolt 8 is now greater than the diameter D of the workpiece, so that the frame can easily be passed over the workpiece until the stop 21 comes up against it. If the handle 16 is now let loose, the needle moves forward under the influence of the spring 3 and causes the measuring bolt to approach the workpiece until it comes to rest on it. The feeler 18 of the dial gauge then always follows the needle. The feeler 18, and consequently also the dial gauge, comes to rest whenever the measuring bolt rests on the workpiece, and the dimension of the diameter D can be read on the dial.

But, in order that such measurements may be made quickly and easily over a big range and with the necessary accuracy, a number of further steps have been taken; they are described below.

With the frame 12, as drawn, dimensions differing from the dimension D can evidently be measured. If for instance, the needle stands in its middle position when measuring D, a dimension of $D+v \tan a$ can be measured with the needle in the furthest back position, and a dimension of $D-v \tan a$ with the needle quite to the front, if $v$ is equal to half the possible path moved through by the needle. Practically, this path can exceed a certain dimension without the appliance becoming unwieldy. Further, also $a$ must be kept small if great accuracy of reading is to be attained, so that for an accuracy of $\frac{1}{1000}$ mm., it is practically not possible to measure more than about 2½–3 mm. with one frame. If greater differences are to be measured in uninterrupted sequence, it will therefore be necessary to use feeler bolts of different lengths or, as shown in Swiss Patent No. 235,059, exchangeable frame anvils of different lengths, or finally frames of different sizes. In order that the measuring ranges may overlap, the separate exchangeable parts must differ from one another by steps of 2 mm., for instance. Of these three possibilities it has been found in practice that the adoption of frames 12 of different sizes is the most suitable, since this gives the greatest possible accessibility of the appliance to workpieces fixed in machine tools and the greatest measuring range.

In order that the accuracy of measuring may not be adversely affected by changing the frames, and in order that the changing may take place quickly and easily, the following arrangement has been adopted:

For holding the frame 12, which consists of a simple flat plate, a slot 23 is machined in a lateral lug 22 of the shaft, the slot having a bottom surface 24 machined exactly parallel to the axis of the shaft and a front-stop surface 25 exactly at right angles to the bottom. In this slot the frame can be pushed, fitting it exactly, its bottom surface 25a and its front surface 26 lying exactly on the corresponding surfaces of the slot. The frame is held in fixed position by means of an eccentric bolt 27, which is carried in the side walls 28 and 28a of the slotted lug and whose eccentric middle part 29 engages in the part 30 of the inserted frame, so that, when turned on its axis through about 90°, it presses the frame downwards and forwards, the frame thus sitting firmly and accurately in the desired position on the shaft. For rotating the bolt 27, a lever 31, rigidly connected with it, is used. The bolt can thus be taken out in order to change the frame. These arrangements, therefore, make possible not only an always exactly accurate positioning of the frame, but also its quick and easy changing without the aid of any kind of tool whatever.

A further essential requirement for the measurements always remaining accurate, is the elimination of any trouble caused through the inertia of the needle moving forward under spring pressure when the handle-bush 20 is suddenly let loose, the inertia exerting an additional and uncontrollable force, under which the needle moves further forwards than it would do if under the influence of approximately uniformly constant spring pressure alone. To eliminate this troublesome inertia effect, pneumatic braking of the needle motion is provided according to the invention; this braking is effected as follows without any additional parts being required:

The bore of the shaft is closed at the front by an hermetically closed cover 32a. Behind the sloping surfaces the needle 2 has a perfectly cylindrical part 32, which fills the needle guide 5 of the shaft with very little play. Also the measuring bolt 8 moves in its guide 9 with very little play, so that the air in the space 33 in front of the needle is practically shut-off from the outside air. Therefore, when the needle is drawn back, the pressure of the air in the space 33 becomes reduced, and the measuring bolt is therefore drawn down by suction against the needle. The needle guide is so long that the ends of the oblique needle surfaces project a little beyond the edge of the guide when the needle is in the extreme rear position, so that the outer air can find its way slowly into the space 33 and the pressure there again becomes atmospheric. When the handle is now suddenly let loose, after the needle has moved a short distance the space 33 is again closed and acts as a dashpot, which allows the needle to move forward at such a speed as is permitted by the escape of compressed air out of the space 33 through the guides of the needle and measuring bolt. This buffer action may be regulated by suitable choice of the play of the needle and the play of the measuring bolt in their guides.

The braking action is less the slower the needle is released, since the air compressed in the space 33 has time to flow out in the way described. Because of this device, the accuracy of measuring is not adversely affected by the inertia of the needle when it is let loose as quickly as desired.

Figure 6:
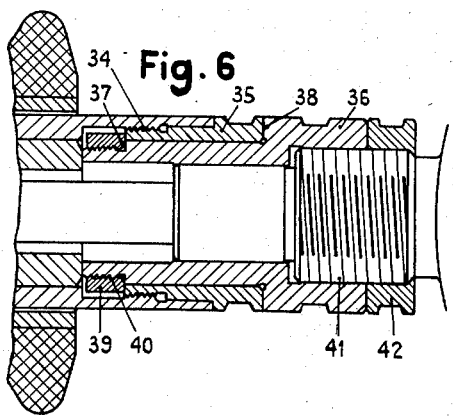
Fig. 6 shows the rotatable adjustment of the dial gauge relative to the shaft.

A further step for increasing the adaptability of the appliance consists in the dial gauge being arranged to turn freely round the shaft axis. This adjustment makes it possible to read the scale easily with the appliance in any position, so that it can be utilised in accordance with the accessibility of the workpieces, whether they are lying on a bench or held in machine tools. The arrangement provided for this purpose is as follows:

The rear shaft end is provided with an internal screw thread 34 (Fig. 6) into which a sleeve 35 is fixed by screwing. In this sleeve 35 a second sleeve 36 can rotate, which is provided with a shoulder 37, which is exactly flush with the end of the sleeve 35 when the shoulder 38 of the sleeve 36 rests on the sleeve 35. This position is secured by a nut 39, which is screwed on a thread 40 of the sleeve 36 and tightened against the shoulder 37, so that the sleeve 36 remains still rotatable with respect to the sleeve 35. The sleeve 36 is provided with an internal thread 41 into which the dial gauge 19 is screwed and clamped firmly to the sleeve 36 by means of the counternut 42. The counternut 42 serves also for the first adjusting of the dial gauge and for later adjusting at any time to take up any wear observed on the measuring bolt or on the frames.

Finally, in order to be able to read the dial as easily and quickly as possible, in addition to the usual tolerance marks for the main scale, an adjustable mark is also provided on the auxiliary scale which records the number of turns made by the main pointer, thus allowing one to determine at a glance, without reading any figures, when the proper dimension has been reached. In this way the disadvantage possessed by the well-known screw micrometer with a 0.5 mm. pitch of thread, is avoided, i. e. that the $1/100$ millimeters may often be read wrong.

Figure 7:
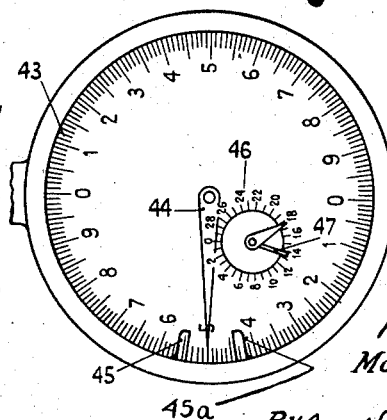
Fig. 7 shows the dial with the adjustable mark on the counting scale.

The arranging of this mark is shown in Fig. 7. There, 43 is the main scale, showing the hundredth and thousandth mm., and divided into 200 parts, over which the main pointer 44 moves. 45 and 45a are the usual tolerance marks adjustable on the edge of the dial and with respect to each other; 46 is an auxiliary scale with, for instance, 30 divisions round it. Each of these divisions corresponds to a half turn of the main pointer, i. e. $^{100}/_{1000}=\frac{1}{10}$ mm. measuring difference. 47 is an auxiliary mark, rotatable and adjustable round the centre of the auxiliary scale. If the appliance has to be adjusted, for instance, to $$57.35 \pm \frac{4}{6}$$

the next smaller frame is chosen, i. e. the one marked with 56, in which the distance D for zero on the two scales=56 mm.; the mark 47 on the auxiliary scale is set to 13.5 and the tolerance marks 45 and 45a to 4.4, and 5.4 on the side where the main scale shows the odd tenths. The workpiece may be, for instance, a shaft to be ground with an additional material allowance of 0.4 mm. When measuring it therefore, the auxiliary pointer comes to the figure 17.5.

If measurements are taken at different phases of the machining, the auxiliary pointer approaches closer and closer to the figure 13.5. As long as this figure is not reached, it is not necessary to observe the main scale. But when the number 13.5 on the auxiliary scale is reached this scale need no longer be observed, but machining is continued further until the main pointer, when a measurement is taken, rests within the marked tolerance region on the main scale. If for instance, it stands at 2.2 at the last measuring, it is known that the shaft is still $^{22}/_{1000}$ too thick. If the adjusting scale on the machine tool is set to this figure, the workpiece can be conveniently finish-machined to the tolerance, without any further measuring. This is the main advantage of the appliance in accordance with the present invention as compared with snap gauges with which the dimension must be repeatedly tested and machining resumed when in the immediate neighbourhood of the finished dimension, in order that the dimension of the piece may not come outside the tolerance, since the snap gauge does not allow of any accurate estimating of the small excess dimension which is still left.

I claim:

1. A device for measuring external dimensions, comprising in combination, a hollow tubular casing having an angular recess formed in one side thereof, a dial indicator connected to said casing at one end thereof, an axially movable member within said casing, said member engaging the spindle of said dial indicator at one end and having a tapered portion at its opposite end, a work engaging member extending from within said casing and engaging said tapered portion, and a frame member fitting said angular recess in the casing and detachably attached to said casing and having a fixed work engaging anvil positioned in opposed relation to said work engaging member, said frame member being retained in position by operation of an eccentric shaft.

2. A device for measuring external dimensions, comprising in combination, a hollow tubular casing having an angular recess formed in one side thereof, a dial indicator connected to said casing at one end thereof, an axially movable member within said casing, said member engaging the spindle of said dial indicator at one end and having a tapered portion at its opposite end, a work engaging member extending from within said casing and engaging said tapered portion, means surrounding said casing at one end to retract said axially movable member and indicator spindle, and a frame member fitting said angular recess in the casing and detachably attached to said casing and having a fixed work engaging anvil positioned in opposed relation to said work engaging member.

3. A device for measuring external dimensions, comprising in combination, a hollow tubular casing having an angular recess formed in one side thereof, a dial indicator connected to said casing at one end thereof, an axially movable member within said casing, said member engaging the spindle of said dial indicator at one end and having a tapered portion at its opposite end, a work engaging member extending from within said casing engaging said tapered portion, and a frame member fitting said angular recess in the casing and detachably attached to said casing and having a fixed work engaging anvil positioned in opposed relation to said work engaging member.

4. A device for measuring external dimensions, comprising in combination, a casing having an angular recess in one side thereof, a work engaging member extending laterally from within said casing, precision means to indicate the radial position of said work engaging member, and a frame member fitting said angular recess and detachably attached to said casing, said frame member having an anvil disposed in opposed relation to said work engaging member, said frame member being retained in position by operation of an eccentric shaft mounted in said casing.

MAX MAAG.

REFERENCES CITED

The following references are of record in the file of this patent:

UNITED STATES PATENTS

| Number | Name | Date |
|---|---|---|
| 484,813 | Nugent | Oct. 25, 1892 |
| 543,935 | Hostler | Aug. 6, 1895 |
| 556,958 | Brunner et al. | Mar. 24, 1896 |
| 590,997 | Masser | Oct. 5, 1897 |
| 593,373 | Estell | Nov. 9, 1897 |
| 706,696 | Simpson | Aug. 12, 1902 |
| 1,196,789 | Koelpin | Sept. 5, 1916 |
| 1,300,210 | Cady | Apr. 8, 1919 |
| 1,417,001 | Volis | May 23, 1922 |
| 1,540,378 | Wasson | June 2, 1925 |
| 1,879,398 | Mirfield | Sept. 27, 1932 |
| 2,000,057 | Arnold | May 7, 1935 |
| 2,048,407 | Price | July 21, 1936 |
| 2,099,930 | Emery | Nov. 23, 1937 |
| 2,135,912 | Rae | Nov. 8, 1938 |
| 2,316,877 | Maag | Apr. 20, 1943 |
| 2,329,067 | Maag | Sept. 7, 1943 |
| 2,334,128 | Robins | Nov. 9, 1943 |
| 2,346,578 | Haskins | Apr. 11, 1944 |
| 2,399,012 | Farrance | Apr. 23, 1946 |
| 2,419,433 | Aller | Apr. 22, 1947 |

FOREIGN PATENTS

| Number | Country | Date |
|---|---|---|
| 174,033 | Great Britain | June 20, 1921 |